(12) United States Patent
Huang et al.

(10) Patent No.: US 11,814,451 B2
(45) Date of Patent: Nov. 14, 2023

(54) METHODS FOR PREPARING BRANCHED POLY (2-HYDROXYETHYL METHACRYLATE) AT ROOM TEMPERATURE BY INVERSE EMULSION POLYMERIZATION

(71) Applicant: CHANGZHOU UNIVERSITY, Jiangsu (CN)

(72) Inventors: Wenyan Huang, Zhangzhou (CN); Bibiao Jiang, Zhangzhou (CN); Li Jiang, Zhangzhou (CN); Hongjun Yang, Zhangzhou (CN); Qimin Jiang, Zhangzhou (CN); Xiaoqiang Xue, Zhangzhou (CN); Di Zhu, Zhangzhou (CN)

(73) Assignee: CHANGZHOU UNIVERSITY, Changzhou (CN)

( * ) Notice: Subject to any disclaimer, the term of this patent is extended or adjusted under 35 U.S.C. 154(b) by 0 days.

(21) Appl. No.: 17/935,573

(22) Filed: Sep. 26, 2022

(65) Prior Publication Data
US 2023/0018276 A1 Jan. 19, 2023

Related U.S. Application Data

(63) Continuation of application No. PCT/CN2020/140466, filed on Dec. 29, 2020.

(30) Foreign Application Priority Data

Apr. 3, 2020 (CN) .......................... 202010257841.6

(51) Int. Cl.
*C08F 120/20* (2006.01)
(52) U.S. Cl.
CPC .................................. *C08F 120/20* (2013.01)
(58) Field of Classification Search
CPC ............. C08F 120/20; C08F 4/00; C08F 2/32
See application file for complete search history.

(56) References Cited

FOREIGN PATENT DOCUMENTS

| CN | 102911310 A | 2/2013 |
|---|---|---|
| CN | 103788315 A | 5/2014 |
| CN | 105418840 A | 3/2016 |
| CN | 106699959 A | 5/2017 |
| CN | 111363083 A | 7/2020 |
| DE | 19524868 C2 | 5/2000 |

OTHER PUBLICATIONS

Jiang et al., "Radical Polymerization in the Presence of Peroxide and Reducing Agent Monomer for Branched Polymer," Journal of Polymer Science, Part A: Polymer Chemistry, 2019, 57, pp. 833-840 (Year: 2019).*
International Search Report in PCT/CN2020/140466 dated Mar. 31, 2021, 5 pages.
Written Opinion in PCT/CN2020/140466 dated Mar. 31, 2021, 8 pages.
Jiang, Qimin et al., Radical Polymerization in the Presence of Peroxide and Reducing Agent Monomer for Branched Polymers, Polymer Chemistry, 57: 833-840, 2019.
Decision to Grant a Patent in Chinese Application No. 202010257841.6 dated Jan. 11, 2022, 3 pages.
First Office Action in Chinese Application No. 202010257841.6 dated Feb. 10, 2021, 11 pages.
Second Office Action in Chinese Application No. 202010257841.6 dated Sep. 2, 2021, 8 pages.

* cited by examiner

*Primary Examiner* — Robert D Harlan
(74) *Attorney, Agent, or Firm* — METIS IP LLC

(57) ABSTRACT

The present disclosure may generally relate to the field of polymer synthesis and provide a method for preparing branched poly(2-hydroxyethyl methacrylate) at room temperature by inverse emulsion polymerization. The method may include: using benzoyl peroxide as an oxidant, and 2-methyl-N-[3-(methyl-phenyl-amino)-propyl]-acrylamide as a reductant monomer to form a redox initiation system, water, and toluene as media, a nonionic surfactant as an emulsifier, 2-hydroxyethyl methacrylate as a monomer, reacting at room temperature and normal pressure to obtain branched poly(2-hydroxyethyl methacrylate). In the present disclosure, the polymerization system may be simple and stable, and the synthesis and purification of the reductant monomer may be simple, greatly reducing the polymerization cost. The reaction may not need temperature control and pressure control, with low energy consumption, easy operation, and less impact on the environment. The obtained branched poly(2-hydroxyethyl methacrylate) may have a high molecular weight. The molecular weight and a branching degree may be adjusted in a wide range. The method may be of great significance to the theoretical research and large-scale application of branched poly(2-hydroxyethyl methacrylate).

4 Claims, 2 Drawing Sheets

METHODS FOR PREPARING BRANCHED POLY (2-HYDROXYETHYL METHACRYLATE) AT ROOM TEMPERATURE BY INVERSE EMULSION POLYMERIZATION

CROSS-REFERENCE TO RELATED APPLICATIONS

This application is a continuation of International Patent Application No. PCT/CN2020/140466, filed on Dec. 29, 2020, which claims priority of Chinese Patent Application No. 202010257841.6, filed on Apr. 3, 2020, the contents of each of which are hereby incorporated by reference.

TECHNICAL FIELD

The present disclosure generally relates to the field of functional polymer preparation in polymer synthesis, and in particular, to a method for preparing branched poly(2-hydroxyethyl methacrylate) at room temperature by inverse emulsion polymerization.

BACKGROUND

Poly(2-hydroxyethyl methacrylate) is a hydrophilic polymer. Linear poly(2-hydroxyethyl methacrylate) is often used as a hydrophilic modified material, as well as for the film formation and spinning of hydrophilic films and fibers. At the same time, as a water-soluble polymer material, it can also be used as a flocculant and an oil displacing agent. Cross-linked poly(2-hydroxyethyl methacrylate), as a hydrogel material with good light transmittance, can be used for the production of contact lenses and artificial corneas. Compared with linear poly(2-hydroxyethyl methacrylate), branched poly(2-hydroxyethyl methacrylate) has lower viscosity at the same molecular weight. During the film formation and spinning, the polymer solution is required to have a certain viscosity. Since branched poly(2-hydroxyethyl methacrylate) can have a higher molecular weight at the same viscosity, it can be expected to have a higher mechanical strength than linear poly(2-hydroxyethyl methacrylate) films and fibers. Meanwhile, branched poly(2-hydroxyethyl methacrylate) can also serve as a good prepolymer for cross-linked hydrogels. Compared with linear poly(2-hydroxyethyl methacrylate), branched poly(2-hydroxyethyl methacrylate) has better fluidity, is easy to be reactively shaped, and requires a relatively less cross-linking agent. Therefore, developing and enriching synthetic methods for branched poly(2-hydroxyethyl methacrylate) is of great value.

At present, the methods for synthesizing branched poly (2-hydroxyethyl methacrylate) mainly include: using a chain transfer agent monomer containing both double bonds and sulfhydryl groups as a branched monomer to synthesize branched poly(2-hydroxyethyl methacrylate) through sulfhydryl chain transfer hyperbranched polymerization and free radical polymerization in solution; using a diene monomer containing two double bonds as a branching monomer to synthesize branched poly(2-hydroxyethyl methacrylate) through atom transfer radical polymerization (ATRP). However, the sulfhydryl chain transfer hyperbranched polymerization requires an introduction of a monomer with sulfhydryl groups, most of which have unpleasant odors; while the ATRP polymerization requires an introduction of a transition metal compound, which seriously affects the application range of products, and has a high cost and requires a harsh condition. The two polymerization methods for the preparation of poly(2-hydroxyethyl methacrylate) have two common disadvantages: relatively long polymerization time required for high monomer conversion, and lower molecular weight of products.

SUMMARY

The present disclosure may aim to provide a method for preparing branched poly(2-hydroxyethyl methacrylate) by inverse emulsion polymerization at room temperature. Benzoyl peroxide (BPO) may be used as an oxidant and 2-methyl-N-[3-(methyl-phenyl-amino)-propyl]-acrylamide (MPAEMA) may be used as a reductant monomer to form a redox initiation system. Under a condition of inverse emulsion polymerization, a reaction of 2-hydroxyethyl methacrylate may be initiated at room temperature, and branched poly(2-hydroxyethyl methacrylate) may be directly obtained.

The polymerization system may be simple and the operation may be easy. The polymerization rate may be fast and the reaction time may be short. The obtained poly(2-hydroxyethyl methacrylate) may have a high molecular weight and a narrow molecular weight distribution. The molecular weight and a degree of branching of poly(2-hydroxyethyl methacrylate) may be adjusted according to the polymerization condition.

A method for preparing branched poly(2-hydroxyethyl methacrylate) by inverse emulsion polymerization at room temperature may include: using benzoyl peroxide (BPO) as an oxidant, 2-methyl-N-[3-(methyl-phenyl-amino)-propyl]-acrylamide (MPAEMA) as a reductant monomer to form a redox initiation system, water and toluene as media, a nonionic surfactant as an emulsifier, and 2-hydroxyethyl methacrylate as a polymerization monomer, by radical inverse emulsion polymerization, reacting at room temperature to obtain branched poly(2-hydroxyethyl methacrylate).

A preparation method of the used reductant monomer 2-methyl-N-[3-(methyl-phenyl-amino)-propyl]-acrylamide (MPAEMA) may be as follows:

(1) dissolving N-(3-aminopropyl)-N-methylaniline (commercially available), triethylamine, and methacryloyl chloride in tetrahydrofuran respectively to prepare a dilute solution with a concentration of 1 g/10 mL;

(2) weighing the solutions according to a molar ratio of N-(3-aminopropyl)-N-methylaniline, triethylamine, and methacryloyl chloride of 4:6:5, mixing and vigorously stirring the N-(3-aminopropyl)-N-methylaniline solution and the triethylamine solution at 0° C.-5° C. to form a mixed solution, simultaneously dropping the methacryloyl chloride solution into the mixed solution slowly. After 24 hours of reaction, filtering out a filtrate, removing a solvent in the filtrate by rotary evaporation to obtain a crude product, and dissolving the crude product in diethyl ether and dropping into n-hexane for recrystallization to obtain the reductant monomer MPAEMA.

A ratio of amount of substance of the oxidant monomer and amount of substance of the reductant monomer may be 1:1.

A ratio of amount of substance of the reductant monomer and amount of substance of the polymer monomer may be 1:80~1:160.

A concentration of an aqueous solution of the polymer monomer may be 25%.

A mass ratio of water and toluene may be 1:1.

A reaction temperature of the polymerization may be 25° C.; a reaction time of the polymerization may be 1 hour-8 hours.

The surfactant may be a complex emulsifier of Tween 80 and Span 85, and a mass ratio of Tween 80 and Span 85 may be 1:1.

A mass of the surfactant may be 10% of a mass of toluene.

The obtained poly(2-hydroxyethyl methacrylate) may have a branched structure, such that the solubility may be better and the viscosity of the solution may also be relatively low, facilitating formation and processing by a solvent volatilization film-forming technique.

In the present disclosure, dibenzoyl peroxide and 2-methyl-N-[3-(methyl-phenyl-amino)-propyl]-acrylamide may be used to compose a redox initiation system. Under an inverse emulsion polymerization condition, the polymerization of 2-hydroxyethyl methacrylate may be initiated at room temperature and normal pressure to obtain branched poly(2-hydroxyethyl methacrylate). Using a suitable inverse emulsion polymerization reaction condition, the polymerization speed may be fast, the reaction time may be short, and the monomer conversion rate may be high. The molecular weight of the obtained poly(2-hydroxyethyl methacrylate) may be high. The molecular weight and the degree of branching may be adjusted according to the polymerization reaction condition. The whole system may be simple and stable, with a mild condition and easy operation, and may be suitable for the promotion of large-scale applications.

Compared with the prior art, the present disclosure may have the following beneficial technical effects:

1. in the method of the present disclosure, the used reductant monomer may be simple to synthesize and easy to purify; the whole reaction system may be simple and stable, the reaction condition may be gentle, do not need temperature control, the operation may be easy, the impact on the environment may be less, energy consumption may be low, and may be suitable for industrial mass production.

2. in the method of the present disclosure, the reaction time may be short, the monomer conversion rate may be high, and the molecular weight of the obtained poly(2-hydroxyethyl methacrylate) may be high and may be controlled in a wider range, which may be conducive to accurately control the synthesis process of branched poly(2-hydroxyethyl methacrylate), thereby preparing branched poly(2-hydroxyethyl methacrylate) products that may meet different needs.

DETAILED DESCRIPTION

Figure 1:
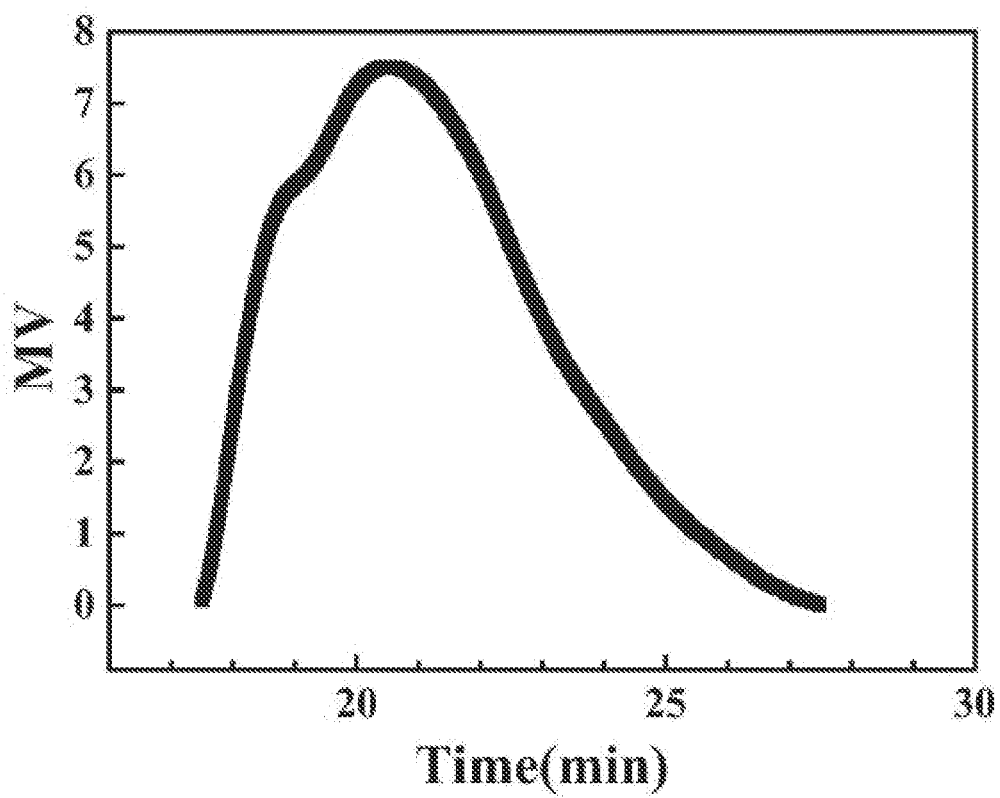
FIG. 1 is a gel permeation chromatography (GPC) outflow volume curve of embodiment 1.
Figure 2:
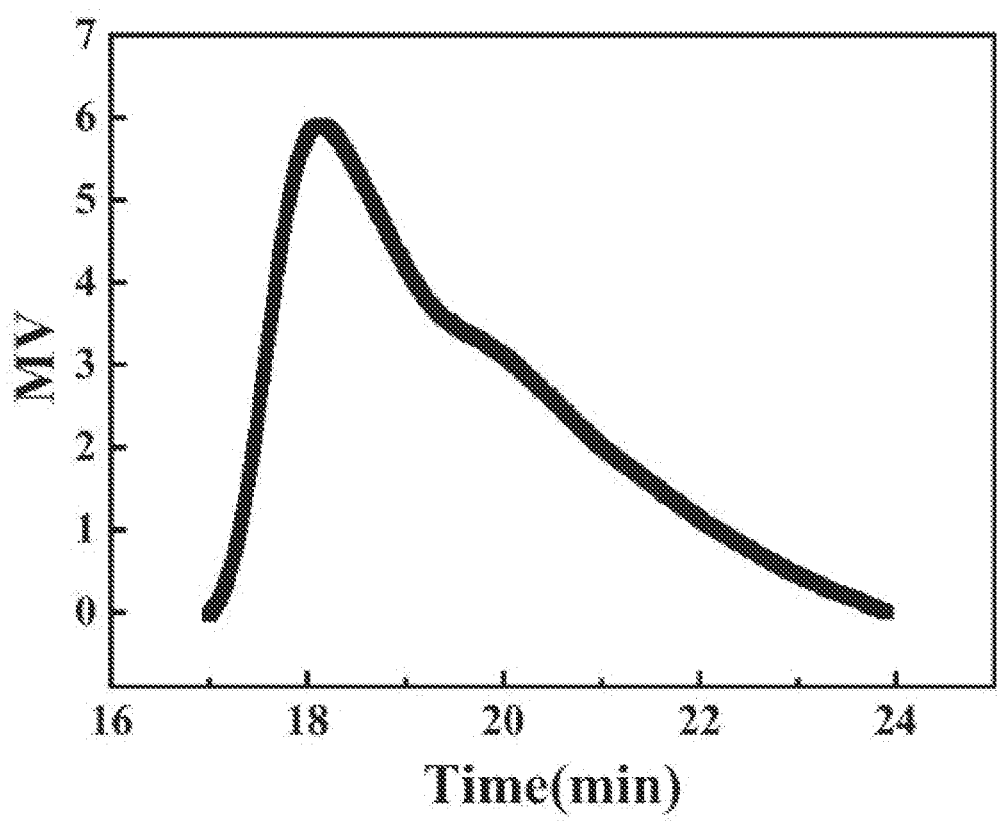
FIG. 2 is a GPC outflow volume curve of embodiment 3.

The present disclosure may use the following embodiments to further illustrate the technical characteristics of the present disclosure, but the protection scope of the present invention may be not limited to the following embodiments.

Embodiment 1

Adding 2-hydroxyethyl methacrylate (10.4112 g, 0.0800 mol) to water (31.2336 g, 300 wt % 2-hydroxyethyl methacrylate) to dissolve and to prepare a 2-hydroxyethyl methacrylate aqueous solution (25 wt %); adding the 2-hydroxyethyl methacrylate aqueous solution to a reaction flask containing toluene (41.6448 g, 400 wt % 2-hydroxyethyl methacrylate), Span 85 (2.0822 g, 5 wt % toluene), Tween 80 (2.0822 g, 5 wt % toluene), and a reductant monomer MPAEMA (0.2320 g, 0.0010 mol), after stirring evenly and vacuuming the oxygen, adding an oxidant BPO (0.2422 g, 0.0010 mol), placing in a 25° C. water bath for 8 hours, and measuring a conversion rate of 2-hydroxyethyl methacrylate to be 94.3%; breaking emulsion with tetrahydrofuran, washing with water for three times then drying, and purify for three times then drying to obtain a polymer; analyzing the polymer by dynamic and static light scattering and an Ubbelohde viscometer, and the results being as follows: absolute weight average molecular weight $M_{W,MALLS}$=2442000 g/mol, mean square radius of gyration $R_g$=31.22 nm, intrinsic viscosity [r]=37.81 mL/g, and calculated relative branching factors of the polymer g=0.52, g'=0.45.

The reductant monomer MPAEMA may be prepared as follows:

(1) dissolving N-(3-aminopropyl)-N-methylaniline (commercially available), triethylamine, and methacryloyl chloride in tetrahydrofuran respectively to prepare a dilute solution with a concentration of 1 g/10 mL.

(2) weighing the solutions according to a molar ratio of N-(3-aminopropyl)-N-methylaniline, triethylamine, and methacryloyl chloride of 4:6:5, mixing and vigorously stirring the N-(3-aminopropyl)-N-methylaniline solution and the triethylamine solution at 0° C.-5° C. to form a mixed solution, simultaneously dropping the methacryloyl chloride solution into the mixed solution slowly; after 24 hours of reaction, filtering out a filtrate, removing a solvent in the filtrate by rotary evaporation to obtain a crude product, and dissolving the crude product in diethyl ether and dropping into n-hexane for recrystallization to obtain the reductant monomer MPAEMA.

Embodiment 2

Adding 2-hydroxyethyl methacrylate (13.0140 g, 0.1000 mol) to water (39.0420 g, 300 wt % 2-hydroxyethyl methacrylate) to dissolve and to prepare a 2-hydroxyethyl methacrylate aqueous solution (25 wt %); adding the 2-hydroxyethyl methacrylate aqueous solution to a reaction flask containing toluene (52.0560 g, 400 wt % 2-hydroxyethyl methacrylate), Span 85 (2.6028 g, 5 wt % toluene), Tween 80 (2.6028 g, 5 wt % toluene), and the reductant monomer MPAEMA (0.2320 g, 0.0010 mol), after stirring evenly and vacuuming the oxygen, adding an oxidant BPO (0.2422 g, 0.0010 mol), placing in a 25° C. water bath for 8 hours, and measuring a conversion rate of 2-hydroxyethyl methacrylate to be 93.7%; breaking emulsion with tetrahydrofuran, washing with water for three times then drying, and purifying for three times then drying to obtain a polymer; analyzing the polymer by dynamic and static light scattering and an Ubbelohde viscometer, and the results being as follows: absolute weight average molecular weight $M_{W,MALLS}$=2083000 g/mol, mean square radius of gyration $R_g$=33.35 nm, an intrinsic viscosity [η]=44.26 mL/g and calculated relative branching factors of the polymer g=0.65, g'=0.58.

A preparation method of the reductant monomer MPAEMA may be the same as embodiment 1.

Embodiment 3

Adding 2-hydroxyethyl methacrylate (15.6168 g, 0.1200 mol) to water (46.8504 g, 300 wt % 2-hydroxyethyl methacrylate) to dissolve and to prepare a 2-hydroxyethyl methacrylate aqueous solution (25 wt %); adding the 2-hydroxyethyl methacrylate aqueous solution to a reaction flask containing toluene (62.4672 g, 400 wt % 2-hydroxyethyl methacrylate), Span 85 (3.1234 g, 5 wt % toluene), Tween 80 (3.1234 g, 5 wt % toluene), and a reductant monomer MPAEMA (0.2320 g, 0.0010 mol), after stirring evenly and vacuuming the oxygen, adding an oxidant BPO (0.2422 g, 0.0010 mol), placing in a 25° C. water bath for 8 hours, and measuring a conversion rate of 2-hydroxyethyl methacrylate to be 94.5%; breaking emulsion with tetrahydrofuran, washing with water for three times then drying, and purifying for three times then drying to obtain a polymer; analyzing the polymer by dynamic and static light scattering and an Ubbelohde viscometer, and the results being as follows: absolute weight average molecular weight $M_{W,MALLS}$=1671000 g/mol, mean square radius of gyration $R_g$=35.87 nm, intrinsic viscosity [η]=52.87 mL/g, and calculated relative branching factors of the polymer g=0.85, g'=0.79.

The preparation of the reductant monomer MPAEMA may be the same as embodiment 1.

Embodiment 4

Adding 2-hydroxyethyl methacrylate (20.8224 g, 0.1600 mol) to water (62.4672 g, 300 wt % 2-hydroxyethyl methacrylate) to dissolve and to prepare a 2-hydroxyethyl methacrylate aqueous solution (25 wt %); adding the 2-hydroxyethyl methacrylate aqueous solution to a reaction flask containing toluene (83.2896 g, 400 wt % 2-hydroxyethyl methacrylate), Span 85 (4.1645 g, 5 wt % toluene), Tween 80 (4.1645 g, 5 wt % toluene), and a reductant monomer MPAEMA (0.2320 g, 0.0010 mol), after stirring evenly and vacuuming the oxygen, adding an oxidant BPO (0.2422 g, 0.0010 mol), placing in a 25° C. water bath for 8 hours, and measuring a conversion rate of 2-hydroxyethyl methacrylate to be 93.4%; breaking emulsion with tetrahydrofuran, washing with water for three times then drying, and purifying for three times then drying to obtain a polymer; analyzing the polymer by dynamic and static light scattering and an Ubbelohde viscometer, and the results being as follows: absolute weight average molecular weight $M_{W,MALLS}$=2811000 g/mol, mean square radius of gyration $R_g$=44.33 nm, intrinsic viscosity [η]=85.10 mL/g, and calculated relative branching factors of the polymer g=0.96, g'=0.94.

The preparation of the reductant monomer MPAEMA may be the same as embodiment 1.

Embodiment 5

Adding 2-hydroxyethyl methacrylate (10.4112 g, 0.0800 mol) to water (31.2336 g, 300 wt % 2-hydroxyethyl methacrylate) to dissolve and to prepare a 2-hydroxyethyl methacrylate aqueous solution (25 wt %); adding the 2-hydroxyethyl methacrylate aqueous solution to a reaction flask containing toluene (41.6448 g, 400 wt % 2-hydroxyethyl methacrylate), Span 85 (2.0822 g, 5 wt % toluene), Tween 80 (2.0822 g, 5 wt % toluene), and a reductant monomer MPAEMA (0.2320 g, 0.0010 mol), after stirring evenly and vacuuming the oxygen, adding an oxidant BPO (0.2422 g, 0.0010 mol), placing in a 25° C. water bath for 8 hours, and measuring a conversion rate of 2-hydroxyethyl methacrylate to be 24.3%; breaking emulsion with tetrahydrofuran, washing with water for three times then drying, and purifying for three times then drying to obtain a polymer; analyzing the polymer by dynamic and static light scattering and an Ubbelohde viscometer, and the results being as follows: absolute weight average molecular weight $M_{W,MALLS}$=2335000 g/mol, mean square radius of gyration $R_g$=29.62 nm, intrinsic viscosity [η]=33.22 mL/g, and calculated relative branching factors of the polymer g=0.49, g'=0.42.

The preparation of the reductant monomer MPAEMA may be the same as embodiment 1.

Comparative Embodiment 1

Adding 2-hydroxyethyl methacrylate (10.4112 g, 0.0800 mol) to water (31.2336 g, 300 wt % 2-hydroxyethyl methacrylate) to dissolve and prepare a 2-hydroxyethyl methacrylate aqueous solution (25 wt %); adding the 2-hydroxyethyl methacrylate aqueous solution to a reaction flask containing toluene (62.4672 g, 600 wt % 2-hydroxyethyl methacrylate), Span 85 (2.0822 g, 5 wt % toluene), Tween 80 (2.0822 g, 5 wt % toluene), and a reductant monomer MPAEMA (0.2320 g, 0.0010 mol), after stirring evenly and vacuuming the oxygen, adding an oxidant BPO (0.2422 g, 0.0010 mol), placing in a 25° C. water bath for 8 hours, finding massive emulsion breaking and agglomeration, and measuring a conversion rate of 2-hydroxyethyl methacrylate to be 9.4%; breaking emulsion with tetrahydrofuran, without obtaining a polymer.

The preparation of the reductant monomer MPAEMA may be the same as embodiment 1.

Comparative Embodiment 2

Adding 2-hydroxyethyl methacrylate (10.4112 g, 0.0800 mol) to water (31.2336 g, 300 wt % 2-hydroxyethyl methacrylate) to dissolve and prepare a 2-hydroxyethyl methacrylate aqueous solution (25 wt %); adding the 2-hydroxyethyl methacrylate aqueous solution to a reaction flask containing toluene (27.7632 g, 267 wt % 2-hydroxyethyl methacrylate), Span 85 (2.0822 g, 5 wt % toluene), Tween 80 (2.0822 g, 5 wt % toluene), and a reductant monomer MPAEMA (0.2320 g, 0.0010 mol), after stirring evenly and vacuuming the oxygen, adding an oxidant BPO (0.2422 g, 0.0010 mol), placing in a 25° C. water bath for 8 hours, finding massive emulsion breaking and agglomeration, and measuring a conversion rate of 2-hydroxyethyl methacrylate to be 5.9%; breaking emulsion with tetrahydrofuran, without obtaining a polymer.

The preparation of the reductant monomer MPAEMA may be the same as embodiment 1.

Comparative Embodiment 3

Adding 2-hydroxyethyl methacrylate (10.4112 g, 0.0800 mol) to water (31.2336 g, 300 wt % 2-hydroxyethyl methacrylate) to dissolve and prepare a 2-hydroxyethyl methacrylate aqueous solution (25 wt %); adding the 2-hydroxyethyl methacrylate aqueous solution to a reaction flask containing toluene (41.6440 g, 400 wt % 2-hydroxyethyl methacrylate), Span 85 (2.0822 g, 5 wt % toluene), Tween 80 (2.0822 g, 5 wt % toluene), and a reductant monomer MPAEMA (0.2322 g, 0.0010 mol), after stirring evenly and vacuuming the oxygen, adding an oxidant BPO (0.4847 g, 0.0020 mol), placing in a 25° C. water bath for 8 hours, finding emulsion breaking; breaking emulsion with tetrahydrofuran, and finding that the polymer cross-links.

The preparation of the reductant monomer MPAEMA may be the same as embodiment 1.

What is claimed is:

1. A method for preparing branched poly (2-hydroxyethyl methacrylate) at room temperature by inverse emulsion polymerization, the method comprising:

using benzoyl peroxide (BPO) as an oxidant and 2-methyl-N-[3-(methyl-phenyl-amino)-propyl]-acrylamide (MPAEMA) as a reductant monomer to form a redox initiation system, water and toluene as media, emulsifiers, 2-hydroxyethyl methacrylate as a polymer monomer, and obtaining branched poly (2-hydroxyethyl methacrylate) by a reaction at the room temperature through radical inverse emulsion polymerization, wherein a ratio of amount of substance of the oxidant monomer and amount of substance of the reductant monomer is 1:1;

the polymer monomer is added to water to dissolve to form an aqueous solution with a concentration of 25%;

a reaction temperature of the polymerization is 25° C.;

a reaction time of the polymerization is 8 hours;

a ratio of amount of substance of the reductant monomer and amount of substance of the polymer monomer is 1:80-1:160; and a mass ratio of water phase and toluene is 1:1.

2. The method of claim 1, wherein the reductant monomer 2-methyl-N-[3-(methyl-phenyl-amino)-propyl]-acrylamide is prepared by:

(1) dissolving N-(3-aminopropyl)-N-methylaniline, triethylamine, and methacryloyl chloride in tetrahydrofuran respectively to prepare a dilute solution with a concentration of 1 g/10 mL;

(2) mixing and vigorously stirring the N-(3-aminopropyl)-N-methylaniline solution and the triethylamine solution at 0° C.-5° C. to form a mixed solution, simultaneously dropping the methacryloyl chloride solution into the mixed solution slowly, reacting for 24 hours, filtering out a filtrate, removing a solvent in the filtrate by rotary evaporation to obtain a crude product, and dissolving the crude product in diethyl ether and dropping into n-hexane for recrystallization to obtain the reductant monomer MPAEMA.

3. The method of claim 2, wherein a mole ratio of N-(3-aminopropyl)-N-methylaniline, triethylamine, and methacryloyl chloride in (2) is 4:6:5.

4. The method of claim 1, wherein a total mass of the emulsifiers is 10% of a mass of the toluene.

* * * * *